3,721,620
PROCESS FOR THE EXTRACTION OF AROMATIC HYDROCARBONS
Giancarlo Paret, Milan, and Ermanno Cinelli, San Donato Milanese, Italy, assignors to Snam Progetti S.p.A., Milan, Italy
Filed July 17, 1970, Ser. No. 55,904
Claims priority, application Italy, July 18, 1969, 19,813/69
Int. Cl. C10g 21/02
U.S. Cl. 208—317          6 Claims

ABSTRACT OF THE DISCLOSURE

A multi-stage countercurrent process for the solvent extraction of aromatic hydrocarbons from a mixed feed stock is disclosed wherein the feed is contacted with solvent and extracted in a first stage, extract from the first stage is purified in a second stage by countercurrent contact with an overhead fraction from a third stage wherein the second stage extract is distilled, and rectification is effected in a fourth stage wherein water is refluxed and a part of the water, obtained as reflux free of solvent, is vaporized and recycled to the bottom of this rectification stage to recover the sensible heat of lean solvent.

---

The present invention relates to a process for the extraction of aromatic hydrocarbons from a hydrocarbon mixture.

Several processes for extracting aromatic hydrocarbons from petroleum and petrochemical mixtures are well known.

Said processes make use of solvents which selectively dissolve aromatic hydrocarbons.

Figure 1:
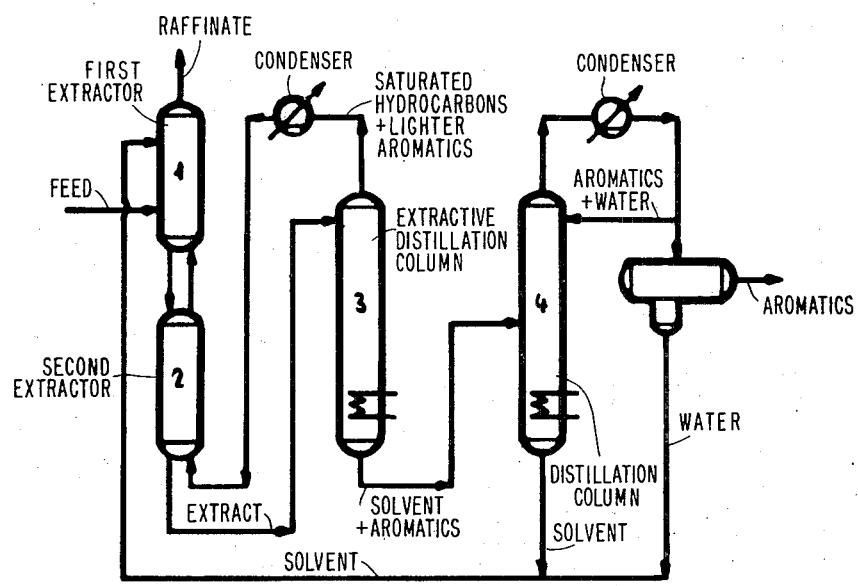
FIG. 1 is a diagrammatic elevation of apparatus adapted for use in a four-stage process for the extraction of aromatic hydrocarbons.

Generally the processes of extraction by solvents of aromatic hydrocarbons comprise four main stages (see FIG. 1):

(1) The first stage consists in contacting the feed mixture with the solvent, generally in a countercurrent contact system. The two streams obtained are a raffinate with a very low content of aromatic hydrocarbons and an extract containing practically all the aromatic hydrocarbons present in the feed mixture.

(2) The second stage, again a liquid-liquid extraction, consists in contacting in countercurrent relation the extract of the first stage with the overhead products of the third stage. This contact is caused for the purpose of removing the heavier non-aromatic hydrocarbons present in the extract of the first stage and coming from the feed mixture.

The two streams coming from the second stage are a light one, sent to the first stage, and a bottom product sent to the third stage.

Particularly this bottom product is constituted by the solvent, aromatic hydrocarbons and saturated hydrocarbons.

Said saturated hydrocarbons are not the same as those present in the extract of the first stage either as composition or generally as amount.

For this reason generally a solvent is selected that presents a good selectivity between aromatic and non-aromatic hydrocarbons and at the same time a good selectivity for lower boiling homologous hydrocarbons having different number of carbon atoms.

(3) The third stage consists in an extractive distillation of the extract coming from the second stage.

Said distillation gives an overhead product consisting of the saturated hydrocarbons, present in the extract of the second stage, and part of the lighter aromatic hydrocarbons. This overhead stream is refluxed to the second stage, while the bottom product of the extractive distillation consists of solvent and of aromatics, the latter already at the desired purity.

(4) The fourth stage consists in a distillation of the bottom product coming from the third stage. In this way aromatics are obtained as overhead and solvent as bottom product. The first and second stages may be carried out in a single apparatus.

The third and fourth stages are on the contrary preferably carried out in different apparatuses.

Also when the aromatic hydrocarbons in the overhead of the third stage are already at the desired purity, the use of two different apparatuses for the third and fourth stages allows an easier reaching of the desired purity and the use of heat at lower thermal level.

In the connection of these four stages above mentioned several variations are possible that allow, according to different conditions, with the same aromatics recovery, important consumption savings and improvements in the purity of the extracted aromatics.

It is known for instance that it is possible to introduce into the reflux to the second stage light saturated hydrocarbons with the result of removing the heavy saturated hydrocarbons from the extract sent to the second stage. Since these light saturated hydrocarbons have boiling points different from the ones of the aromatics to be recovered, their separation becomes easier in the subsequent stages.

It is also known that is may be advantageous to introduce water into the reflux to the second stage.

This water dissolves in the solvent and it increases the solvent selectivity improving the removal from the extract of the hydrocarbons having lower polarity, i.e. raising the purity of the aromatics contained in said extract.

It is an object of the present invention to provide an improved cycle of extraction which allows one to obtain aromatic hydrocarbons at high recovery and degree of purity with reduced heat consumption.

Figure 2:
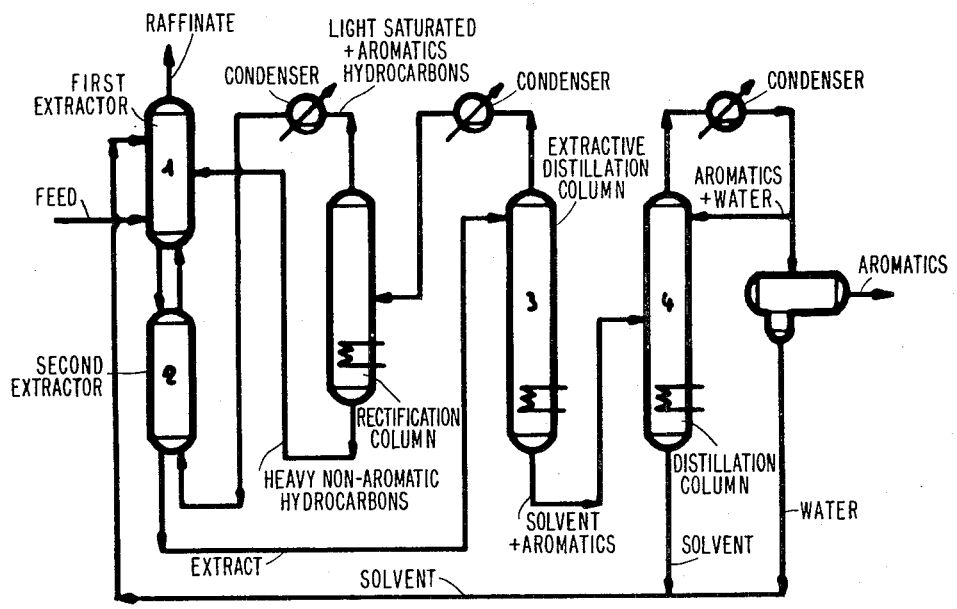
FIG. 2 is a diagrammatic elevation of a modification according to our invention of the apparatus illustrated in FIG. 1.

According to the present invention the overhead from the third stage, to be sent to the second stage, is rectified in the absence of solvent (see FIG. 2).

In this way the heavier products containing saturated hydrocarbons, having high boiling points, and non-aromatic hydrocarbons having a very high polarity as some hydrocarbons in the class of naphthenes, naphthenes bi- and polycyclic, olephines, cycloolephines and derived compounds, are obtained from the bottom of the rectifying stage.

As overhead products saturated and light aromatic hydrocarbons are obtained and sent to the second stage, while the bottom may be drained or sent to suitable points of the extraction cycle, so as to avoid its accumulation into the cycle. Said stream, i.e. the bottom, may be introduced into the first stage between the feed inlet and the solvent inlet. Said separation is possible also, in the easiest cases, by condensation at two different thermal levels, refluxing to the second stage the condensate coming from the lower thermal level.

The overhead of the third and fourth stages contains large amount of water.

The water contained in the overhead of the third stage is sent to the second stage, according to known techniques.

It is a feature of the process according to the present invention to make use of the water separated from the overhead of the fourth stage.

This water does not contain solvent.

Figure 3:
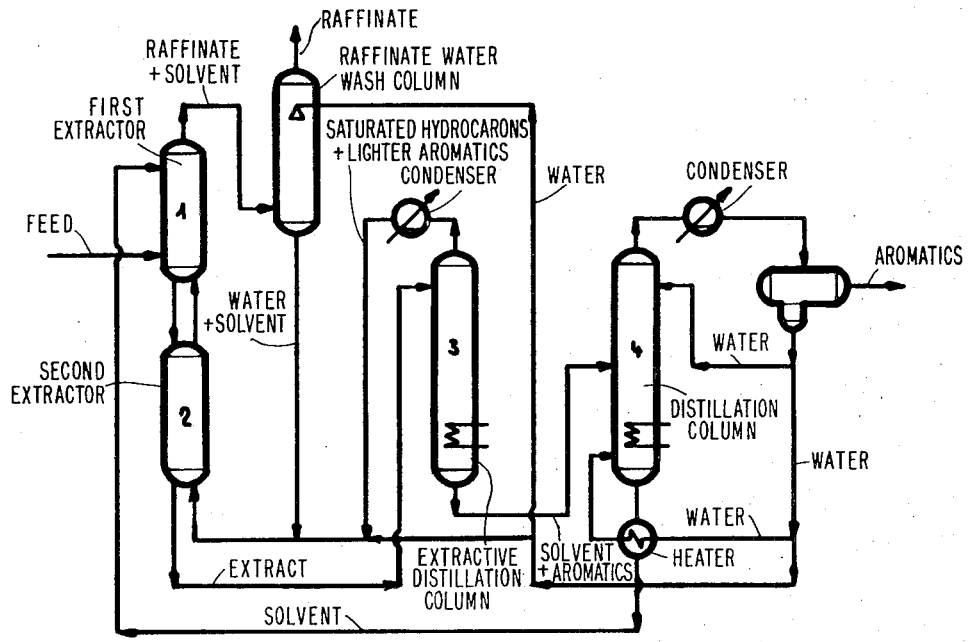
FIG. 3 is a diagrammatic elevation of another modification according to our invention of the apparatus illustrated in FIG. 1.

According to the process of the present invention said water is divided in four variable streams depending on the operative conditions and it is utilized as follows (see FIG. 3).

One stream is refluxed to the top of the stripper, i.e. fourth stage, with the advantage of washing the rising vapors and of avoiding the presence of solvent in the overhead.

A second stream is recycled to the second stage, while a third stream is utilized to wash the raffinate and then is mixed with the preceding stream.

The remaining water is vaporized by indirect heat exchange with the lean solvent coming from the bottom of the fourth stage and is introduced at the bottom of the stripper, i.e. the fourth stage.

Said operation, carried out in presence of water which does not contain any solvent, allows one to lower the thermal level and therefore to improve the heat recovery yield.

According to the described process the extraction solvents with a water content up to 30% by weight are particularly efficient, provided that said solvents present good selectivity and solvency for the aromatics, and therefore several advantages in carrying out the above mentioned process are present with respect to the known ones.

The temperature in the extraction operations of the first and second stages ranges from 0° C. to 90° C. while in the distillation operations of the third and fourth stages it ranges from 50° C. to 200° C.

The solvents advantageously utilized in the process according to the present invention are the ones in the classes of sulfolane and its derivatives, the N-alkyl-pyrrolidones, the dialkylsulfoxides, the dimethyl or dialkyl formamides, the diacetyl formamides, the methyl carbamide, the glycols and the etherated glycols, the alkylmorpholines, said solvents may be utilized in anhydrous form or mixed with water.

When the feed has a very high content of aromatics, in the overhead of the third stage it is preferred, according to the process of the present invention, to obtain aromatics at the desired value of purity and to recycle them as reflux to the second stage.

Also in this case it is a feature of the present invention to effect the third and fourth stages in two different apparatuses. In the other cases the achievement of said conditions should be too onerous therefore the reflux consists of aromatic and saturated hydrocarbons.

In said conditions there is the possibility of accumulation of the non-aromatics presenting an anomalous polarity and already mentioned, and the above mentioned rectification operation is necessary when this condition exists.

It is worthy of notice that said operation proved itself to be advantageous also when there is not an accumulation of undesired products; the above separation allows one, in any case, to obtain from the third stage an extract containing aromatics of higher purity.

According to the fundamental cycle of solvent extraction, when a light saturated fraction is added to the overhead of the third stage, to be recycled to the second stage, exploiting in that way the selectivity between light and heavy saturated hydrocarbons of the solvent, we found the following way of operating to be very satisfactory.

As the light saturated fraction has the tendency to pass into the raffinate of the second stage to the first stage a recovery is necessary so as to maintain in the cycle a constant amount of said light saturated hydrocarbons without large make up.

The recovery practice can be effected either on the raffinate of the first stage or on the raffinate of the second stage. We have noticed that by effecting it on the second stage raffinate, instead of the first stage one, several operative advantages are gotten, like a reduction of the amount of solvent necessary for the first operation and therefore of the column dimension and of the heat consumption of the whole cycle.

Figure 4:
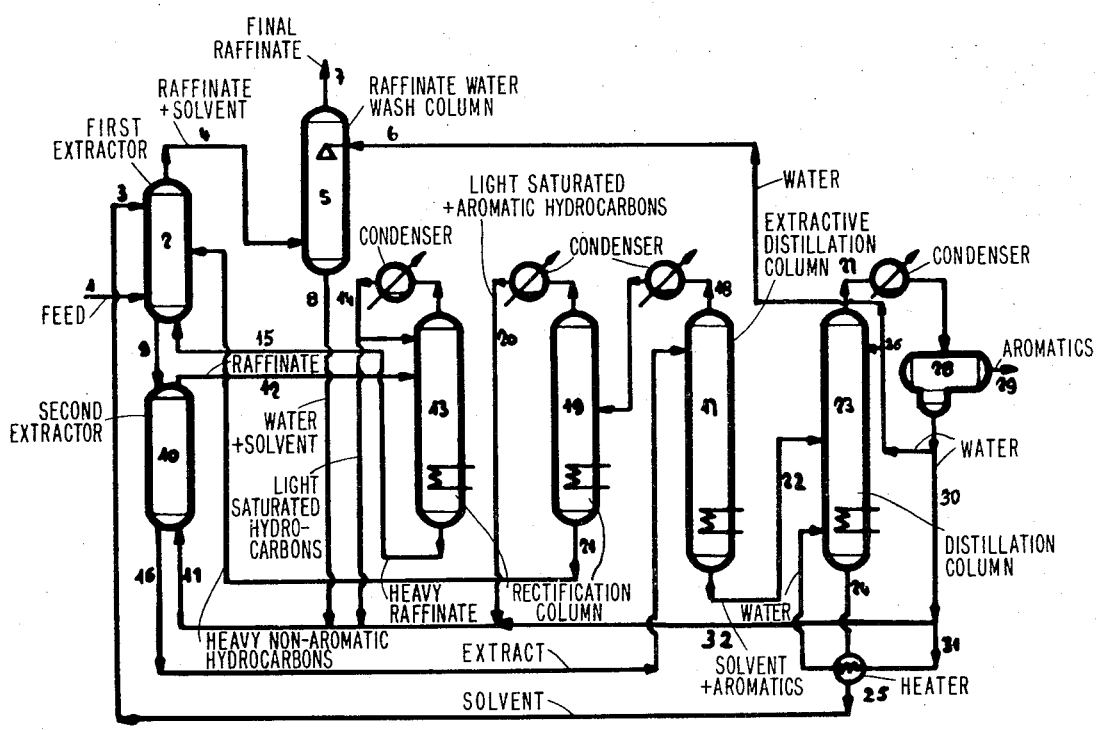
FIG. 4 is a diagrammatic elevation of the apparatus used in the practice of the specific example of our invention that is described in the specification.

As an illustrative but not limitative example we will describe the process of the present invention referring to FIG. 4. Through pipe 1 the feed mixture is sent to the lower part of the extractor 2 where a multi-stage contact in countercurrent relation is effected, the solvent is introduced at the top of the extractor through line 3.

The raffinate leaves the extractor from the top through line 4 and is fed to the bottom of the washing column 5 where, to the top, water is fed through 6.

From the top the raffinate leaves the column 5 through 7 while from the bottom, through line 8, the washing water from 2 containing traces of solvent that was present in the raffinate leaves the same column.

From the bottom of column 2, through line 9, the aromatic enriched solvent goes to the top of column 10, where the purification agent is introduced at the bottom of said column through 11.

Said stream, in the present case, consists of water, light aliphatic hydrocarbons and the lightest aromatics.

From the top of the extractor 10, through 12 the raffinate leaves said purification extractor 10. Said stream is fed to the rectification column 13, through 12, where the light aliphatic hydrocarbons are separated and withdrawn as overhead through 14, while the heavier fraction is obtained as bottom product and recycled through 15 to the bottom of the extractor 2. It is evident that the light aliphatics, except the amount sent to the extractive distillation column, effect their function in a closed loop between the column 10 and 13, while the amount sent to the extractive distillation works in a wider closed loop.

From the extractor 10, as bottom product, an extract having a high purity is obtained and through line 16 is fed to the extractive distillation column 17.

In said column, according to the above mentioned techniques, the extractive distillation of the obtained extract is effected. The selective function of the solvent allows one to obtain as overhead product, through line 18, all the non-aromatic hydrocarbon compounds together with a part of the present lighter aromatics. Said stream is condensed and sent to the column 19 where a rectification is effected and an overhead is separated, withdrawn through 20 and reused in closed loop.

From the bottom of column 19, through line 21, a high boiling fraction is withdrawn containing also the non-aromatic hydrocarbons which present anomalous polarity, said fraction is recycled to the extractor 2 at a point above the feed inlet.

In this way an accumulation of the hydrocarbons of anomalous polarity is avoided.

If said compounds are not present said stream may be added to the feed mixture.

From the bottom of column 17 the solvent, containing the aromatics of specified purity, is obtained.

Said stream, through line 22, is fed to the column 23 where the separation of the hydrocarbons from the solvent is carried out.

The lean solvent is withdrawn from the bottom through line 24, sent to the exchanger 25 where most of its sensible heat content is recovered, and then the solvent is re-used in the extraction. To the top of the column 23 water is refluxed through 26 so as to obtain an overhead product without solvent.

Through line 27 an overhead is obtained, condensed and decanted in the decanter 28 wherein the upper layer is constituted by aromatics at specification purity that are withdrawn through line 29.

The lower layer consisting of water is withdrawn through line 30. Part of this water is refluxed to the column 23 through 26, while another part is sent as washing agent to the column 5 through line 6.

The remaining water is divided and one part is fed, through 31, to the exchanger 25 and sent as vapor to the bottom of column 23. The remainder is mixed through line 32, with the streams of lines 20, 14, 8 and, as purification agent, enters the extractor 10 through 11.

What we claim is:

1. A process for the extraction of aromatic hydrocarbons comprising a first stage of solvent extraction wherein the feed mixture is contacted with solvent selected from the group consisting of anhydrous and aqueous alkyl derivatives of morpholine and with a low boiling fraction of hydrocarbons coming from a subsequent stage in a multi-stage system in countercurrent, a second stage of purification of the extract of the first stage by solvent extraction wherein said first stage extract is contacted in countercurrent with a hydrocarbon fraction purification agent coming at least in part from a subsequent third stage of extractive distillation, a third stage of extractive distillation of the extract, coming from the second stage, which gives an overhead to be utilized in the second stage as purification agent and finally a fourth stage of rectification of the bottom of the third stage so as to separate the aromatics from said solvent which is then recycled to the first stage characterized in the combination of at least two of the following steps consisting in:

carrying out the final rectification with water reflux;

separating the raffinate of the second stage into a fraction of light aliphatic hydrocarbons and a fraction of heavier aliphatic hydrocarbons and recycling said heavier aliphatic hydrocarbons to the first stage;

separating the overhead of the third stage into a low boiling fraction and a high boiling fraction;

utilizing the low boiling fraction of the overhead of the third stage of extractive distillation as reflux to the second stage of purification;

recycling the high boiling fraction of the overhead of the third stage of extractive distillation to the first stage, at a point intermediate the introduction of feed and solvent to said first stage;

vaporizing a part of the water, free of solvent, obtained as overhead of the fourth stage of final rectification and recycling said vapor to the bottom of the same rectification stage, so as to recover the sensible heat of the lean solvent.

2. A process according to claim 1 characterized in that the separation of the low boiling fraction of the overhead from the third stage of extractive distillation is carried out by rectification in absence of solvent.

3. A process according to claim 1 characterized in that the separation of the low boiling fraction of the overhead coming from the third stage of extractive distillation is carried out by condensation in two or more stages.

4. A process according to claim 1 characterized in that a low boiling aliphatic fraction is added to the reflux fraction of the second stage of extract purification.

5. A process according to claim 1 characterized in that an aqueous stream is added to the reflux fraction of the second stage of purification.

6. A process according to claim 1 characterized in that the reflux fraction of the second stage of purification of the extract is constituted by aromatic hydrocarbons already at final specification purity and it is produced in a stripper different from that one which gives the final product.

References Cited

UNITED STATES PATENTS

| | | | |
|---|---|---|---|
| 3,487,013 | 12/1969 | Van Tassell | 208—321 |
| 3,551,327 | 12/1970 | Kelly et al. | 208—321 |
| 3,558,480 | 1/1971 | Broughton | 208—321 |
| 3,262,875 | 7/1966 | Girotti et al. | 208—321 |
| 3,325,399 | 6/1967 | Cinelli et al. | 208—321 |

HERBERT LEVINE, Primary Examiner

U.S. Cl. X.R.

208—313, 318, 321, 326